United States Patent
Hou

(10) Patent No.: US 9,407,092 B2
(45) Date of Patent: Aug. 2, 2016

(54) POWER SUPPLY DEVICE AND POWER MANAGEMENT METHOD

(71) Applicant: Zijilai Innovative Services Co., Ltd., Shenzhen (TW)

(72) Inventor: Kuei-Chih Hou, New Taipei (TW)

(73) Assignee: Zijilai Innovative Services Co., Ltd., Shenzhen (CN)

( * ) Notice: Subject to any disclaimer, the term of this patent is extended or adjusted under 35 U.S.C. 154(b) by 397 days.

(21) Appl. No.: 14/084,626

(22) Filed: Nov. 20, 2013

(65) Prior Publication Data

US 2015/0015074 A1    Jan. 15, 2015

(30) Foreign Application Priority Data

Jul. 15, 2013  (TW) ................................ 102125176

(51) Int. Cl.
*H02J 9/00* (2006.01)
*H02J 1/10* (2006.01)

(52) U.S. Cl.
CPC ............ *H02J 1/102* (2013.01); *H02J 2001/106* (2013.01); *Y10T 307/62* (2015.04)

(58) Field of Classification Search
CPC ... H02J 1/102; H02J 2001/106; Y10T 307/62
USPC .......................................................... 307/65
See application file for complete search history.

(56) References Cited

U.S. PATENT DOCUMENTS 6,166,934 A * 12/2000 Kajouke ................... B60L 1/00
                                                      363/65

* cited by examiner

*Primary Examiner* — Hal Kaplan
(74) *Attorney, Agent, or Firm* — ScienBiziP, P.C.

(57) ABSTRACT

A method for managing a number of power supply units (PSUs) of a power supply device is provided. A total operation time of each PSU is counted. A number of the PSUs to be assigned to work is determined according to a load value of a load connected to the power supply device. Which of the PSUs will be assigned to work and which of the PSUs will be assigned to idle are determined according to the total operation time of each PSU and the determined number of the PSUs to be assigned to work. The PSUs to be assigned to work are controlled to enter a work state, and the PSUs to be assigned to idle are controlled to enter a standby mode.

12 Claims, 2 Drawing Sheets

POWER SUPPLY DEVICE AND POWER MANAGEMENT METHOD

BACKGROUND

1. Technical Field

The present disclosure relates to power supply devices, and particularly to a power supply device for electronic devices consuming lots of power and a power management method.

2. Description of Related Art

Electronic devices that consume lots of power require a number of power supply units (PSUs) to provide power to the electronic device. To save power, when a load value of a load connected to the PSUs is low, a sleep schedule is adopted to allow some PSUs to idle. However, the sleep schedule determines which of the PSUs are to idle without considering a total operation time of each PSU. Therefore, some PSUs may work longer than others and may be damaged easily.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Embodiments of the present disclosure are described, with reference to the accompanying drawings.

Figure 1:
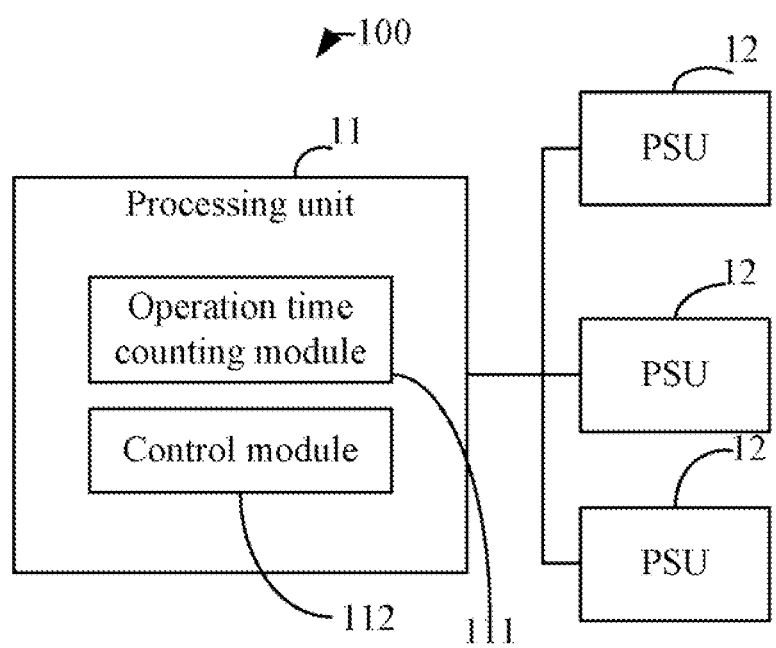
FIG. 1 is a block diagram of an embodiment of a power supply device.

FIG. 1 shows an embodiment of a power supply device 100. The power supply device 100 includes a processing unit 11 and a number of power supply units (PSUs) 12 connected in parallel. The PSUs 12 provide power to a load (not shown) connected to the power supply device 100. The processing unit 11 includes an operation time counting module 111 and a control module 112. The operation time counting module 111 and the control module 112 are collections of software instructions.

Figure 2:
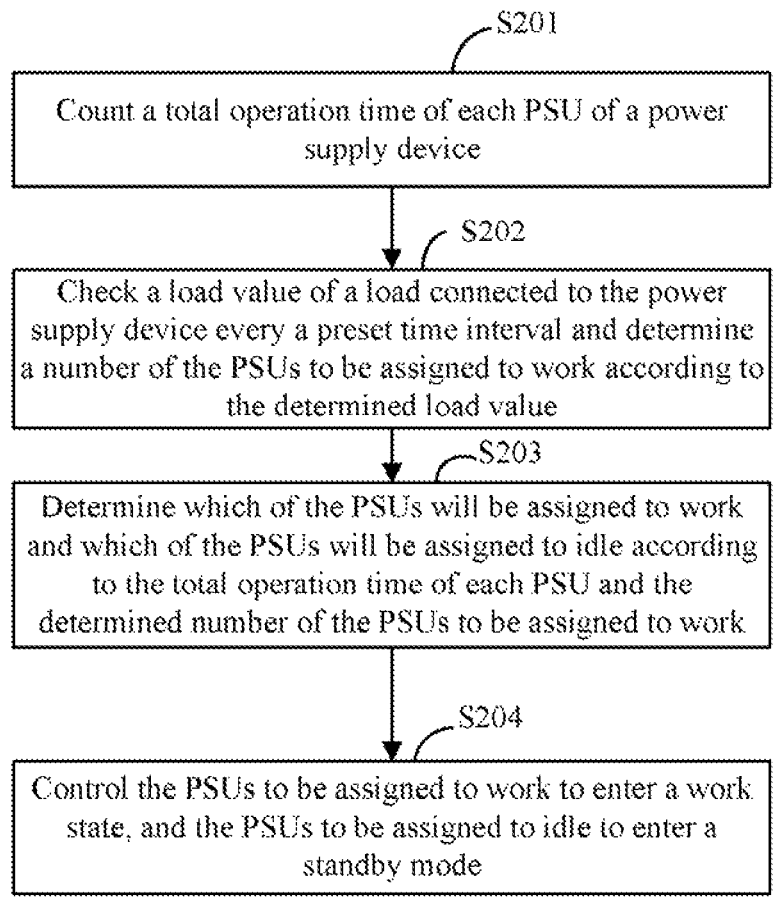
FIG. 2 is a flowchart of an embodiment of a power management method of the power supply device of FIG. 1.

FIG. 2 is a flowchart of an embodiment of a power management method.

In step S201, the operation time counting module 111 counts a total operation time of each PSU 12.

In step S202, the control module 112 checks a load value of a load connected to the power supply device 100 at a preset time interval and determines a number of the PSUs 12 to be assigned to work according to the load value. If the load value is greater, the number of the PSUs 12 to be assigned to work is greater.

In step S203, the control module 23 determines which of the PSUs 12 will be assigned to work and which of the PSUs 12 will be assigned to idle according to the total operation time of each PSU 12 and the determined number of the PSUs 12 to be assigned to work. The total operation time of each PSU 12 to be assigned to work is less than the total operation time of any PSU 12 to be assigned to idle. In this embodiment, the control module 23 computes a time difference for each PSU 12 at each time interval. The time difference is calculated by subtracting a total operation time of each PSU 12 from an average operation time of all the PSUs 12. The control module 23 sorts all the PSUs 12 in a sequence according to the calculated time differences. The PSU 12 having a greatest positive time difference is determined to have worked the least amount of time and is arranged first in the sequence. The control module 12 determines how many of the PSUs 12 in front of the sequence are to be assigned to work according to the determined number of the PSUs 12 to be assigned to work, that is, according to the determined load value. Thus, the control module 12 directs the PSUs 12 having less total operation time to work, and directs the PSUs 12 having more total operation time to idle.

In step S204, the control module 23 controls the PSUs 12 to be assigned to work to enter a work state, and the PSUs 12 to be assigned to idle to enter a standby mode. When one PSU 12 to be assigned to work cannot work normally, the control module 12 selects one PSU 12 from the resting PSUs 12 to work, to ensure that the load receives enough power to work. The total operation time of the selected PSU 12 is least among the total operation time of each of the PSUs 12 to be assigned to idle In this embodiment, every the preset time interval, the control module 23 re-determines the PSUs 12 to be assigned to work and re-determines the PSUs 12 to be assigned to idle. Thus, some PSUs 12 can be switched to idle after working a period, and some PSUs 12 can be switched to work after resting a period. When the control module 23 determines to replace one PSU 12 to be switched from a work state to a rest state with one PSU 12 to be switched from the rest state to the work state, the control module 23 controls the PSU 12 to be switched from the work state to the rest state to continue to work a preset time interval after directing the PSU 12 to be switched from the rest state to the work state to work. After the preset time interval, the control module 23 controls the PSU 12 to be switched from the work state to the rest state to idle. Thus, the load can work normally during switching time.

With such configuration, the power supply device 100 assigns the work and rest of each PSU 12 according to the total operation time of each PSU 12, to prevent some PSU 12 from being damaged by working a long time.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A power supply device comprising:
    a plurality of power supply units (PSUs) connected in parallel; and
    a processing unit comprising:
        an operation time counting module to count a total operation time of each of the plurality of PSUs; and
        a control module to check a load value of a load connected to the power supply device at a preset time interval and determine a number of the PSUs to be assigned to work every a preset time interval according to the load value, determine which of the plurality of the PSUs will be assigned to work and determine which of the plurality of the PSUs will be assigned to idle according to the total operation time of each of the plurality of the PSUs and the determined number of the PSUs to be assigned to work, control the PSUs to be assigned to work to enter a work state, and control the PSUs to be assigned to idle to enter a standby mode, wherein, the total operation time of each of the PSUs to be assigned to work is less than the total operation time of any of the PSUs to be assigned to idle.

2. The power supply device as described in claim 1, wherein the control module is to compute a time difference for each of the plurality of the PSUs by subtracting a total operation time of each of the plurality of PSUs from an average operation time of all the PSUs every the preset time interval, sort the plurality of the PSUs in a sequence according to the calculated time differences, and determine how many of the PSUs in front of the sequence will be assigned to work according to the determined number of the PSUs to be assigned to work, the PSU having a greatest positive time difference is arranged first in the sequence.

3. The power supply device as described in claim 1, wherein the control module is to select one PSU from the PSUs to be assigned to idle, and direct the selected PSU to work when one PSU to be assigned to work works abnormally, the total operation time of the selected PSU is least among the total operation time of each of the PSUs to be assigned to idle.

4. The power supply device as described in claim 1, wherein when the control module determines to replace one PSU to be switched from a work state to a rest state with one PSU to be switched from the rest state to the work state, the control module is to control the PSU to be switched from the work state to the rest state to continue to work a preset time interval after directing the PSU to be switched from the rest state to the work state to work, and further to control the PSU to be switched from the work state to the rest state to idle after the preset time interval.

5. A method for managing a plurality of power supply units (PSUs) of a power supply device, the plurality of PSUs being connected in parallel, the method comprising:
counting a total operation time of each of the plurality of PSUs;
checking a load value of a load connected to the power supply device at a preset time interval and determining the number of the PSUs to be assigned to work according to the load value;
determining which of the plurality of the PSUs will be assigned to work and determining which of the plurality of the PSUs will be assigned to idle according to the total operation time of each of the plurality of the PSUs and the determined number of the PSUs to be assigned to work; and
controlling the PSUs to be assigned to work to enter a work state, and the PSUs to be assigned to idle to enter a standby mode, wherein, the total operation time of each of the PSUs to be assigned to work is less than the total operation time of any of the PSUs to be assigned to idle.

6. The method as described in claim 5, wherein determining which of the plurality of the PSUs will be assigned to work and determining which of the plurality of the PSUs will be assigned to idle according to the total operation time of each of the plurality of the PSUs and the determined number of the PSUs to be assigned to work comprises:
computing a time difference for each of the plurality of the PSUs by subtracting a total operation time of each of the plurality of PSUs from an average operation time of all the PSUs every the preset time interval;
sorting the plurality of the PSUs in a sequence according to the calculated time differences, wherein, the PSU having a greatest positive time difference is arranged first of the sequence; and
determining how many of the PSUs in front of the sequence will be assigned to work according to the determined number of the PSUs to be assigned to work.

7. The method as described in claim 5, further comprising:
selecting one PSU from the PSUs to be assigned to idle, and directing the selected PSU to work when one PSU to be assigned to work works abnormally, wherein, the total operation time of the selected PSU is least among the total operation time of each of the PSUs to be assigned to idle.

8. The method as described in claim 5, further comprising:
controlling one PSU to be switched from a work state to a rest state to continue to work a preset time interval after directing one PSU to be switched from the rest state to the work state to work when determining to replace the PSU to be switched from the work state to the rest state with the PSU to be switched from the rest state to the work state; and
controlling the PSU to be switched from the work state to the rest state to idle after the preset time interval.

9. A non-transitory storage medium storing a plurality of modules, the plurality of modules comprising instructions executable by a processing unit of a computing device to perform a method for managing a plurality of power supply units (PSUs) of a power supply device, the plurality of PSUs being connected in parallel, the method comprising:
counting a total operation time of each of the plurality of PSUs;
checking a load value of a load connected to the power supply device at a preset time interval and determining a number of the PSUs to be assigned to work according to the load value;
determining which of the plurality of the PSUs will be assigned to work and determining which of the plurality of the PSUs will be assigned to idle according to the total operation time of each of the plurality of the PSUs and the determined number of the PSUs to be assigned to work; and
controlling the PSUs to be assigned to work to enter a work state, and the PSUs to be assigned to idle to enter a standby mode, wherein, the total operation time of each of the PSUs to be assigned to work is less than the total operation time of any of the PSUs to be assigned to idle.

10. The storage medium as described in claim 9, wherein determining which of the plurality of the PSUs will be assigned to work and determining which of the plurality of the PSUs will be assigned to idle according to the total operation time of each of the plurality of the PSUs and the determined number of the PSUs to be assigned to work comprises:
computing a time difference for each of the plurality of the PSUs by subtracting a total operation time of each of the plurality of PSUs from an average operation time of all the PSUs every the preset time interval;
sorting the plurality of the PSUs in a sequence according to the calculated time differences, wherein, the PSU having a greatest positive time difference is arranged first of the sequence; and
determining how many of the PSUs in front of the sequence will be assigned to work according to the determined number of the PSUs to be assigned to work.

11. The storage medium as described in claim 9, wherein the method further comprises:
selecting one PSU from the PSUs to be assigned to idle, and directing the selected PSU to work when one PSU to be assigned to work works abnormally, wherein, the total operation time of the selected PSU is least among the total operation time of each of the PSUs to be assigned to idle.

12. The storage medium as described in claim 9, wherein the method further comprises:

controlling one PSU to be switched from a work state to a rest state to continue to work a preset time interval after directing one PSU to be switched from the rest state to the work state to work when determining to replace the PSU to be switched from the work state to the rest state with the PSU to be switched from the rest state to the work state; and controlling the PSU to be switched from the work state to the rest state to idle after the preset time interval.

* * * * *